US012394059B2

(12) United States Patent
Ma et al.

(10) Patent No.: US 12,394,059 B2
(45) Date of Patent: *Aug. 19, 2025

(54) SAMPLE SEGMENTATION

(71) Applicant: X Development LLC, Mountain View, CA (US)

(72) Inventors: Hongxu Ma, Mountain View, CA (US); Allen Richard Zhao, Mountain View, CA (US); Cyrus Behroozi, Menlo Park, CA (US); Derek Werdenberg, Sunnyvale, CA (US); Jie Jacquot, San Carlos, CA (US); Vadim Tschernezki, Schonefeld (DE)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,307

(22) Filed: May 28, 2024

(65) Prior Publication Data

US 2024/0412375 A1   Dec. 12, 2024

Related U.S. Application Data

(63) Continuation of application No. 17/383,278, filed on Jul. 22, 2021, now Pat. No. 12,033,329.

(51) Int. Cl.
*G06V 10/00* (2022.01)
*G06T 7/11* (2017.01)
*G06V 10/26* (2022.01)

(52) U.S. Cl.
CPC ............ *G06T 7/11* (2017.01); *G06V 10/26* (2022.01); *G06T 2207/10036* (2013.01); *G06T 2207/20224* (2013.01)

(58) Field of Classification Search
CPC ............ G06T 7/11; G06T 2207/10036; G06T 2207/20224; G06V 10/82; G06V 10/58; G06V 10/26
See application file for complete search history.

(56) References Cited

U.S. PATENT DOCUMENTS 5,040,229 A   8/1991   Lee et al.
5,835,633 A   11/1998  Fujisaki et al.
(Continued)

FOREIGN PATENT DOCUMENTS

AU   2014292179       12/2015
CN   102289673 A     12/2011
(Continued)

OTHER PUBLICATIONS

Nesteruk et al., "Image Augmentation for Multitask Few-Shot Learning: Agricultural Domain Use-Case," CoRR, Feb. 2021, arxiv.org/abs/2102.12295, 12 pages.
(Continued)

*Primary Examiner* — Amir Alavi
(74) *Attorney, Agent, or Firm* — MUGHAL GAUDRY & FRANKLIN PC

(57) ABSTRACT

Methods, systems, and apparatus, including computer programs encoded on a computer storage medium, for improved image segmentation using hyperspectral imaging. In some implementations, a system obtains image data of a hyperspectral image, the image data comprising image data for each of multiple wavelength bands. The system accesses stored segmentation profile data for a particular object type that indicates a predetermined subset of the wavelength bands designated for segmenting different region types for images of an object of the particular object type. The system segments the image data into multiple regions using the predetermined subset of the wavelength bands specified in the stored segmentation profile data to segment the different (Continued)

region types. The system provides output data indicating the multiple regions and the respective region types of the multiple regions.

20 Claims, 4 Drawing Sheets

(56) References Cited

U.S. PATENT DOCUMENTS

| | | | |
|---|---|---|---|
| 6,879,716 B1 | 4/2005 | Ishibashi | |
| 7,035,457 B2 | 4/2006 | Ishibashi | |
| 7,049,597 B2* | 5/2006 | Bodkin | G01J 3/0289 |
| | | | 250/353 |
| 7,242,478 B1* | 7/2007 | Dombrowski | G01J 3/2823 |
| | | | 356/419 |
| 7,796,316 B2* | 9/2010 | Bodkin | G01J 3/36 |
| | | | 359/227 |
| 7,840,071 B2 | 11/2010 | Tang et al. | |
| 8,164,673 B2 | 4/2012 | Horie | |
| 8,284,991 B2 | 10/2012 | Tojo et al. | |
| 8,406,469 B2 | 3/2013 | Fisher | |
| 8,774,469 B2* | 7/2014 | Subbiah | G01J 3/0262 |
| | | | 382/110 |
| 8,860,942 B1 | 10/2014 | Ewing et al. | |
| 9,107,624 B2 | 8/2015 | Darty | |
| 9,239,957 B2 | 1/2016 | Raducan et al. | |
| 9,251,431 B2 | 2/2016 | Doepke et al. | |
| 9,268,110 B2 | 2/2016 | Bueler et al. | |
| 9,746,376 B2 | 8/2017 | Wein et al. | |
| 9,945,721 B2 | 4/2018 | Abolbashari et al. | |
| 9,977,962 B2* | 5/2018 | Klein | G06V 20/13 |
| 10,013,760 B2 | 7/2018 | Bhargava | |
| 10,352,769 B2* | 7/2019 | Klein | G01J 3/28 |
| 10,403,668 B2* | 9/2019 | Arbabi | H10F 39/8023 |
| 10,452,924 B2 | 10/2019 | Adato et al. | |
| 10,453,197 B1 | 10/2019 | Cholakkal et al. | |
| 10,462,389 B2* | 10/2019 | Klein | H04N 23/10 |
| 10,515,715 B1 | 12/2019 | Pappas et al. | |
| 10,520,482 B2 | 12/2019 | McPeek | |
| 10,656,017 B2 | 5/2020 | Maurer et al. | |
| 10,783,632 B2 | 9/2020 | Fan et al. | |
| 10,810,723 B2 | 10/2020 | Onoro-Rubio et al. | |
| 11,187,657 B2 | 11/2021 | Talbert et al. | |
| 11,222,422 B2 | 1/2022 | Alshurafa et al. | |
| 11,257,213 B2 | 2/2022 | Hendriks et al. | |
| 11,266,304 B2 | 3/2022 | Talbert et al. | |
| 11,393,182 B2* | 7/2022 | Jacquot | G06F 18/217 |
| 11,790,636 B1 | 10/2023 | Almog et al. | |
| 12,033,329 B2* | 7/2024 | Ma | G06V 10/26 |
| 12,076,162 B2* | 9/2024 | Stewart | A61B 5/0075 |
| 2008/0118106 A1 | 5/2008 | Kilambi et al. | |
| 2014/0122044 A1 | 5/2014 | Yasukawa | |
| 2015/0021478 A1 | 1/2015 | Lee et al. | |
| 2016/0007858 A1* | 1/2016 | Hendriks | A61B 5/0066 |
| | | | 600/407 |
| 2016/0358027 A1 | 12/2016 | Hotta et al. | |
| 2017/0130249 A1 | 5/2017 | Steiner et al. | |
| 2017/0147905 A1 | 5/2017 | Huang et al. | |
| 2017/0316285 A1 | 11/2017 | Ahmed et al. | |
| 2018/0284273 A1 | 10/2018 | Buettgen et al. | |
| 2018/0349770 A1 | 12/2018 | Nelson et al. | |
| 2019/0026586 A1 | 1/2019 | Liu et al. | |
| 2019/0065880 A1 | 2/2019 | Loginov et al. | |
| 2019/0139193 A1 | 5/2019 | Navarrete Michelini et al. | |
| 2019/0180153 A1 | 6/2019 | Buckler et al. | |
| 2019/0205643 A1 | 7/2019 | Liu et al. | |
| 2023/0027514 A1 | 1/2023 | Ma et al. | |

FOREIGN PATENT DOCUMENTS

| | | |
|---|---|---|
| CN | 103942562 A | 7/2014 |
| CN | 104050677 A | 9/2014 |
| CN | 104077613 A | 10/2014 |
| CN | 104732240 A | 6/2015 |
| CN | 105528589 A | 4/2016 |
| CN | 108052984 A | 5/2018 |
| CN | 108921822 A | 11/2018 |
| CN | 110084311 | 8/2019 |
| CN | 110647793 | 1/2020 |
| EP | 2208974 A1 | 7/2010 |
| EP | 2942615 A1 | 11/2015 |
| EP | 3567518 A1 | 11/2019 |
| JP | 2011064538 | 3/2011 |
| WO | 2001069191 | 9/2001 |
| WO | 2007098123 A2 | 8/2007 |
| WO | 2015007697 A1 | 1/2015 |
| WO | 2016095117 A1 | 6/2016 |
| WO | 2017130249 A1 | 8/2017 |
| WO | 2017223206 A1 | 12/2017 |
| WO | 2018141429 A1 | 8/2018 |
| WO | 2018187632 A1 | 10/2018 |
| WO | 2019084854 A1 | 5/2019 |
| WO | 2019178561 A2 | 9/2019 |

OTHER PUBLICATIONS

Noroozi et al., "Representation Learning by Learning to Count," Proceedings of the IEEE International Conference on Computer Vision, 2017, pp. 5898-5906.

Notice of Allowance for U.S. Appl. No. 17/383,278, dated Feb. 26, 2024.

Office Action for U.S. Appl. No. 17/383,278, dated Nov. 15, 2023.

pytorch.org/hub/pytorch_vision_mobilenet [online], "MOBILENET V2," Jul. 22, 2019. retrieved on Mar. 22, 2021, retrieved from URL, 2 pages.

Rahnemoonfar et al., "Deep Count: Fruit Counting Based on Deep Simulated Learning," Sensors, Apr. 2017, 17(4):905.

researchgate.net [online], "How to count objects on the image with deep learning algorithms?," Apr. 30, 2020. retrieved on Mar. 22, 2021. retrieved from URL, 8 pages.

Sam et al., "Switching Convolutional Neural Network for Crowd Counting," 2017 IEEE Conference on Computer Vision and Pattern Recognition, 11 pages.

Santos de Arruda et al., "Counting and Locating High-Density Objects Using Convolutional Neural Network," CoRR, Feb. 2021, arxiv.org/abs/2102.04366, 15 pages.

Segui et al., "Learning to Count With Deep Object Features," Proceedings of the IEEE Conference on Computer Vision and Pattern Recognition, 2015, pp. 90-96.

Shang et al. "End-to-end crowd counting via joint learning local and global count," 2016 IEEE International Conference on Image Processing, Sep. 2016, pp. 1215-1219.

Shen et al., "Liquid crystal integrated metalens with tunable chromatic aberration." Advanced Photonics, 2020, 2(3):1-7.

softwaremill.com [online], "Counting Objects with Faster R-CNN." Jun. 2, 2017, retrieved on Mar. 22, 2021, retrieved from URL, 21 pages.

Sokhandan et al., "A Few-Shot Sequential Approach for Object Counting," CoRR, Jul. 2020, arxiv.org/pdf/2007.01899v2, 19 pages.

Sparano et al., "WO2020168094A1 Simultaneous depth profile and spectral measurement", Aug. 20, 2020.

stackoverflow.com [online]. "Tensorflow Count Objects in Image," Feb. 21, 2017, retrieved on Mar. 22, 2021, retrieved from URL, 2 pages.

Stein et al., "Image Based Mango Fruit Detection, Localization and Yield Estimation Using Multiple View Geometry," Sensors, Nov. 2016, 16(11):1915.

Suzuki et al., "Estimation of Chemical Composition of Grass in Meadows using Hyperspectral Imaging," Environ. Control Biol.. 2008. 46(2):129-137.

Takahashi et al., "A Novel Weight-Shared Multi-Stage CNN for Scale Robustness," IEEE Transactions on Circuits and Systems for Video Technology, Apr. 2019, 29(4):1090-1101.

Tan et al. "Cells Counting with Convolutional Neural Network," Intelligent Computing Methodologies, Jul. 2018, pp. I 02-111.

Towardsdatascience.com [online], "Objects Counting by Estimating a Density Map With Convolutional Neural Networks," Sep. 27, 2019, retrieved on Mar. 22, 2021. retrieved from URL, 12 pages.

(56) References Cited

OTHER PUBLICATIONS

Towardsdatascience.com [online], "R-C 'N. Fast R-CNN, Faster R-CNN, YOLO-Object Detection Algorithms," Jul. 9, 2018, retrieved on Mar. 22, 2021, retrieved from URL, 11 pages.
Towardsdatascience.com [online], "Segmenting, localizing and counting object instances in an image," Oct. 26, 2017, retrieved on Mar. 22, 2021, retrieved from URL, 9 pages.
Trajanovsk et al., "Tumor semantic segmentation in hyperspectral images using deep learning," International Conference on Medical Imaging with Deep Learning—Extended Abstract Track, Apr. 2019, 4 pages.
Walach et al., "Learning to Count with CNN Boosting," Computer Vision, Sep. 2016, pp. 660-676.
Wang et al., "Correcting Axial Chromatic Aberration in a Fixed Focal Plane, Near-infrared Imaging System." CSBE/SCGAB 2006 Annual Conference, Jul. 16-19, 2006, 14 pages.
Wikipedia.org [online], "Brix," May 17, 2021, retrieved on Jul. 22, 2021, retrieved from URL, 5 pages.
Wikipedia.org [online], "Optical sorting," Jun. 16, 2021, retrieved on Jul. 22, 2021, retrieved from URL, 9 pages.
Wikipedia.org [online]. "Chemometrics." Jul. 6, 2021, retrieved on Jul. 22, 2021, retrieved from URL, 7 pages.
Xu et al., "Dilated-Scale-Aware Attention ConvNet For Multi-Class Object Counting," CoRR, Dec. 2020, arxiv.org/abs/2012.08149. 7 pages.
Yang et al., "Reverse Perspective Network for Perspective-Aware Object Counting," Proceedings of the IEEE/CVF Conference on Computer Vision and Pattern Recognition, 2020, pp. 4374-4383.
Zhan et al., "A new hyperspectral band selection approach based on convolutional neural network," 2017 IEEE International Geoscience and Remote Sensing Symposium, Jul. 23-28, 2017, pp. 3660-3663.
Zhang et al., "Cross-Scene Crowd Counting via Deep Convolutional Neural Networks," Proceedings of the IEEE Conference on Computer Vision and Pattern Recognition, 2015, pp. 833-841.
Zhao et al., "Chromatic aberrations correction for imaging spectrometer based on acousto-optic tunable filter with two transducers," Optics Express, Oct. 2017, 25(20):23809-23825.
Zhao et al., "Spectral-spatial feature extraction for hyperspectral image classification: A dimension reduction and deep learning approach," IEEE Transactions on Geoscience and Remote Sensing, Apr. 2016, 11 pages.
Zhao et al., "Using deep learning in image hyper spectral segmentation, classification, and detection", Fourth Seminar on Novel Optoelectronic Detection Technology and Application, Feb. 2018, 6 pages.
ai.googleblog.com [online], "MobileNetV2: The Next Generation of On-Device Computer Vision Nehvorks," Apr. 3, 2018, retrieved on Mar. 22, 202L retrieved fromURL, 4 pages.
Akai et al., "Distortion-Adaptive Grape Bunch Counting for Omnidirectional Images," CoRR, Aug. 2020, arxiv.ore/pdf/2008.12511vl, 8 pages.
Alam et al., "CRF learning with CT\i'N features for hyperspectral image segmentation," 2016 IEEE International Geoscience and Remote Sensing Symposium (IGARSS), Jul. 2016, 5 pages.
analyticsvidhya.com [online], "It's a Record-Breaking Crowd! A Must-Read Tutorial to Build your First Crowd Counting Model using Deep Learning," Feb. 18, 2019, retrieved on Mar. 22, 2021, retrieved from URL, 47 pages.
Annibale et al., "Optical measurement of focal offset in trniable lenses," Opt. Express., Jan. 2016, 24(2):1031-1036.
Barbin et al., "Near-infrared hyperspectral imaging for grading and classification of pork," Meat Science, Jan. 2012, 90(1):259-68.
Bargoti et al., "Deep fruit detection in orchards", 2017 IEEE International Conference on Robotics and Automation, Jun. 2017, 8 pages.
Baweja et al., "StalkNet: A Deep Learning Pipeline for High-Throughput Measurement of Plant Stalk Count and Stalk Width," Field and Service Robotics, Nov. 2017, pp. 271-284.
Canplastics.com [online], "The ins and outs of using post-consumer resin in packaging," May 6, 2021, retrieved on Jul. 22, 2021, retrieved from URL, 7 pages.
Chen et al., "Predicting the anthocyanin content of wine grapes by NIR hyperspectral imaging," Food Chemistry, Apr. 2015, 172:788-93.
Cohen et al., "Count-ception: Counting by Fully Convolutional Redundant Counting," Proceedings of the IEEE International Conference on Computer Vision, 2017, pp. 18-26.
Cu-Nguyen et al., "An imaging spectrometer employing tunable hyperchromatic microlenses," Light: Science & Applications, Apr. 2016, 5(el6058): 9 pages.
Cu-Nguyen et al., "Tunable hyperchromatic lens system for confocal hyperspectral sensing," Optics Express, Nov. 2013, 21(23):27611-27621.
Dahab et al.. "Automated Brain Tumor Detection and Identification Using Image Processing and Probabilistic Neural Network Techniques," International Journal of Image Processing and VisualCommunication, 2012, 1(2):2319-1724.
ElMasry et al., "Chemical-free assessment and mapping of major constituents in beef using hyperspectral imaging," Journal of food engineering, Jul. 2013. 117(2):235-46.
Flir.com [online], "Chemical Agent Detection," Aug. 2021, retrieved on Jul. 22, 2021, retrieved from URL, 4 pages.
Flir.com [online]. "Optical gas imaging for the chemical industry," Aug. 2021. retrieved on Jul. 22, 2021. retrieved from URL, 6 pages.
Gao et al., "Counting Dense Objects in Remote Sensing Images," CoRR, Feb. 2020, arxiv.org/abs/2002.05928, 5 pages.
Gao et al., "Intra-Ensemble in Neural Net-works," CoRR. Apr. 2019, arxiv.org/abs/1904.04466, 5 pages.
Gao et al., "PSCNet: Pyramidal Scale and Global Context Guided Network for Crowd Counting," CoRR, Dec. 2020, arxiv.org/pdii2012.03597v, 11 pages.
Gat et al., "Imaging Spectroscopy Using Tunable Filters: A Review," SPIE, Apr. 2000, 4056:50-64.
Godi et al., "SIMCO: SIMilarity-based object Counting," CoRR, Oct. 2020, arxiv.org/pdf/1904.07092v2, 6 pages.
Goel et al., "Low-Power Object Counting with Hierarchical Neural Networks," CoRR, Jul. 2020, arxiv.org/pdf/2007.01369vl, 6 pages.
Gomez et al.. "Hyperspectral system for early detection of rottenness caused by Penicillium digitatum in mandarins," Journal of Food Engineering, Apr. 2008, 89:80-86.
Gomez-Sanchis et al., "Segmentation of hyperspectral images for the detection of rotten mandarins," International Conference Image Analysis and Recognition, Jun. 2008, 2 pages.
Guan et al., "Understanding the Ability of Deep Neural Networks to Count Connected Components in Images." CoRR. Jan. 2021, arxiv.org/abs/2101.01386, 7 pages.
Gupta et al., "Hyperspectral Imaging Using Acoustic-Optic Tunable Filters," SPIE, Apr. 1999, 3718:512-521.
Habermann et al., "Supervised band selection in hyperspectral inlages using single-layer neural networks," International Journal of Remote Sensing, Dec. 2018, 40(10):1-27.
Habermann et al., "Unsupervised Hyperspectral Band Selection Using Clustering and Single-layer Neural Network," Revue Francaise de Photogrammetrie et de Teledetection, Societe Francaise de Photogrammetrie et de Teledetection, Sep. 2018, hal-01880365:33-42.
Halstead et al., "Fruit Quantity and Quality Estimation using a Robotic Vision System," CoRR, Jan. 2018, arxiv.org/abs/1801.05560. 8 pages.
Hani et al., "Apple Counting using Convolutional Neural Networks," 2018 IEEE/RSJ International Conference on Intelligent Robots and Systems, Oct. 2018, 8 pages.
Hu et al., "Deep convolutional neural networks for hyperspectral image classification," Journal of Sensors, Jan. 2015, 13 pages.
International Search Report and Written Opinion for International Application No. PCT/US2022/036556, dated Oct. 19, 2022, 7 pages.
Islam et al., "Detection of potato diseases using image segmentation and multiclass support vector machine," 2017 IEEE 30th Canadian Conference on Electrical and Computer Engineering (CCECE), Apr. 2017, 4 pages.

(56) References Cited

OTHER PUBLICATIONS

Iwai et al., "Speeded-Up Focus Control of Electrically Tm1able Lens by Sparse Optimization," Scientific Reports, 2019, 9(12365):1-6.

Jia et al., "Chromatic aberrations correction for imaging spectrometer based on acousto-optic tunable filter with two transducers," Optics Express, Oct. 2017, 25(20):23809-23825.

Kamruzzaman et al., "Non-destructive prediction and visualization of chemical composition in lamb meat using NIR hyperspectral imaging and multivariate regression," Innovative Food Science & Emerging Technologies, Oct. 2012, 16:218-26.

Kasmani et al., "A-CCNN: adaptive cnn for density estimation and crowd counting," CoRR, Apr. 2018, arxiv.org/abs/1804.06958, 5 pages.

Kemker et al., "Algorithms for semantic segmentation of multispectral remote sensing imagery using deep learning," ISPRS Journal of Photogrammetry and Remote Sensing, Nov. 2018, 45 pages.

Koirala et al., "Deep learning for real-time fruit detection and orchard fruit load estimation: benchmarking of 'MangoYOLO'," Precision Agriculture, Feb. 2019, 20:1107-1135.

Lempitsky et al., "Learning To Count Objects in Images," Advances in neural information processing systems, 2010, 23:1324-32.

Liu et al., "Robust Fruit Counting: Combining Deep Learning, Tracking, and Structure from Motion," 2018 IEEE/RSJ International Conference on Intelligent Robots and Systems, Oct. 2018, 8 pages.

Lorenzo et al., "Segmentation of hyperspectral images using quantized convolutional neural networks," 2018 21st Euromicro Conference on Digital System Design (DSD), Aug. 2018, 8 pages.

Machinelearningmastery.com [online], "How to Configure Image Data Augmentation in Kerns," Apr. 12, 2019, retrieved on Jun. 29, 2020, retrieved from URL https://machinelearningmastery.com/how-to-configure-image-data-augmentation-when-training-deep-learning-neural-networks/, 57 pages.

Mancini et al., "A Multi/hyper-spectral Imaging System for Land Use/land Cover Using Unmanned Aerial Systems", IEEE Xplore, Jun. 17, 2026, pp. 1148-1155.

Marsden et al., "People, Penguins and Petri Dishes: Adapting Object Counting Models To New Visual Domains And Object Types Without Forgetting," CoRR, Nov. 2017, arxiv.org/pdf/1711.05586v1, 10 pages.

mathworks.com [online], "resnet101," Oct. 24, 2018, retrieved on Mar. 22, 2021, retrieved from URL, 3 pages.

Mcgregor et al., "Adaptive hyperspectral imager: design, modeling, and control." Journal of Optics, 2015, 17(8):11 pages.

Mikami et al., "DeepCounter: Using Deep Learning to Count Garbage Bags," 2018 IEEE 24th International Conference on Embedded and Real-Time Computing Systems and Applications, Jan. 2019, 10 pages.

Millian et al., "Dynamic compensation of chromatic aberration in a programmable diffractive lens," Optics Express, Jul. 2006, 14(20):9103-9112.

English Translation of Notice of Reasons for Refusal for Japanese Patent Application No. 2023-579475, dated Jan. 27, 2025.

\* cited by examiner

SAMPLE SEGMENTATION

CROSS-REFERENCE OF RELATED APPLICATIONS

This application is a continuation of an claims priority to U.S. Provisional Patent Application No. 17/383,278, filed on Jul. 22, 2021, titled "SAMPLE SEGMENTATION," which is incorporated by reference in its entirety for all purposes.

TECHNICAL FIELD

This specification generally relates to digital processing of images, and in particular improved image segmentation based on hyperspectral images.

BACKGROUND

Image segmentation is a technique of digital image processing that partitions an image into meaningful portions so that pixels belonging to a particular portion share similar features. This allows analysis of a digital image by defining shapes and boundaries of objects within an image. Image segmentation has been used widely in multiple domains such as autonomous vehicles, medical image diagnostics, and satellite imaging.

Hyperspectral imaging techniques can provide image data about a subject for multiple bands of light that differ in wavelength (e.g., "wavelength bands," "spectral bands," or simply "bands"). This provides significantly more information than grayscale images (e.g., which show intensity across a single, typically large band) and standard color images (e.g., such as RGB images including image information for visible red, green, and blue color bands). The additional data provided in hyperspectral images provides more information about a subject, but the much larger amount of resulting data in hyperspectral images—often for 5, 10, 20, or more different wavelength bands—is often not processed efficiently or applied effectively to image processing tasks such as segmentation.

SUMMARY

According to one innovative aspect of the subject matter described in this specification, a computer system can use hyperspectral images to perform image segmentation with greater accuracy and efficiency than previous approaches. Hyperspectral images include significantly more information than traditional color images. This information comes in many forms, often including more bands than the typical RGB images, including information about narrower spectral bands than traditional RGB Bayer filter bands, and also including information for bands outside the visible range (e.g., infrared, ultraviolet, etc.).

Not all of the wavelength bands of hyperspectral images are relevant to each type of boundary to be segmented, however. As a result, depending on the type of object imaged and its properties (e.g., material, composition, structure, texture, etc.), image data for different hyperspectral wavelength bands may be indicative of region boundaries. Similarly, for some object types and region types, information for some wavelength bands may add noise or actually obscure the desired boundaries, so that reducing segmentation accuracy and increasing the computational cost of segmentation analysis.

The techniques described below explain how a computer system can generate and use profiles that specify the different combinations of wavelength bands that provide accurate and efficient segmentation of different object types and region types. Using these profiles, the system can selectively use the image data in hyperspectral images so that different combinations of the image bands are used for locating different types of regions or types of boundaries in the images. For example, for a particular object type, a profile may indicate that for objects of that object type, a first type of region should be segmented using image data for bands 1, 2, and 3, while a second type of region should be segmented using image data for bands 3, 4, and 5. When processing hyperspectral images of the particular object type, the segmentation parameters specified in the profile are used, including the subset of bands for each region type, e.g., image data for bands 1, 2, and 3 to identify regions of the first type and image data for bands 3, 4, and 5 to identify regions of the second type.

As an example, the segmentation of images of fruit can be used to automatically assess the characteristics and quality of fruit by a computer vision system. Beyond simply segmenting fruit from background, the system can be used to segment different parts of the fruit from each other. For a strawberry, the exterior includes leaves (e.g., calyx, sepals, peduncle), seeds (e.g., achenes), and the flesh (e.g., receptacle). The flesh can have regions of different condition, e.g., ripe, unripe, bruised, moldy, decaying, etc. To facilitate the rapid and efficient machine vision analysis of individual strawberries for quality control or other purposes, the system can generate a profile for the strawberry object type that specifies types of regions of interest (e.g., leaves, seeds, and flesh) and the subsets of bands of a hyperspectral image to be used for segmenting or identifying regions of each region type. These subsets of bands can be determined through data-driven analysis of training examples, which include hyperspectral images and ground truth segmentations indicating the region types for the examples. The profile may specify other parameters for each region type, such as functions to apply to the image data of different bands, thresholds to use, and so on. With the profile defined, the system can process a hyperspectral image of a strawberry accurately and efficiently segment each region type. For each region type, the system can define boundaries for instances of that region type using the subset of bands and other parameters specified in the profile. As a result, each region type can be accurately segmented using the subset of bands that best indicates the region boundaries, and processing is more efficient by limiting the number of bands used for segmentation of each region type.

As another example, the segmentation of images of waste materials can be used to better identify and characterize recyclable materials. As an example, the system can be used to accurately segment regions of image data representing different types of plastics (e.g., polyethylene (PE), polyethylene terephthalate (PET), polyvinyl chloride (PVC), polypropylene (PP), etc.) to automatically detect the material of an object and to identify where objects of different types are located. In addition, the segmentation techniques can be used to identify and characterize additives in materials as well as instances of contamination. For example, in addition to or instead of identifying regions involving one or more primary materials (e.g., PE vs. PET), the segmentation techniques can also identify objects or portions of objects where different additives are present (e.g., phthalates, bromides, chlorates, UV-resistant coatings,) or where contaminants are present (e.g., oils, food residue, etc.). To better characterize regions of different types, the system can generate and store profiles for different types of objects and materials that specify types of regions of interest (e.g., different types of materials, different additives present, different contaminants) and the subsets of bands of a hyperspectral image to be used for segmenting or identifying regions of each region type. These subsets of bands can be determined through data-driven analysis of training examples, which can include hyperspectral images and ground truth segmentations indicating the region types for the examples. The profile may specify other parameters for each region type, such as functions to apply to the image data of different bands, thresholds to use, and so on. With the profiles defined, the system can process a hyperspectral image and accurately and efficiently segment each region type. For each region type, the system can define boundaries for regions composed of different materials, regions where different contaminants are detected, regions where different types of contamination are present, and so on. As a result, each region type can be accurately segmented using the subset of bands that best indicates the region boundaries and processing is more efficient by limiting the number of bands used for segmentation of each region type.

As discussed further below, the system can also define synthetic bands that modify a band before carrying segmentation. A synthetic band can be based on one or more image bands in a hyperspectral image, but may have one or more functions or transformations applied. For example, a synthetic band may be a composite or aggregate of two or more bands, with a function applied to the bands (e.g., addition, subtraction, multiplication, division, etc.). One example is to calculate, as a synthetic band, a normalized index based on two bands, such as taking the difference of two bands divided by the sum of the two bands. For a hyperspectral image where the image for each band has dimensions of 500 pixels by 500 pixels, the result of generating a normalized index for bands 1 and 2 may be a 2D image of 500 pixels by 500 pixels, where each pixel in the result is calculated by combining the two pixels, $P_{band1}$ and $P_{band2}$, at the same position in source images according to the formula $(P_{band1}-P_{band2})/(P_{band1}+P_{band2})$. This of course is only one way to combine image data for different bands, and many different functions can be used.

The synthetic bands, along with other parameters, can be used by the system to amplify or emphasize the types of information that are indicative of region boundaries while filtering or reducing the effect of image information that is not indicative of region boundaries. This provides an enhanced image on which segmentation algorithms can then be applied. By defining the bands and functions for each region of interest in advance, the segmentation processing can be much faster and less computationally expensive than other techniques, such as processing each hyperspectral image with a neural network. In general, the synthetic bands can combine information about a region boundary that is distributed over the image data for various different bands, allowing the system to extract the hyperspectral image components that best signal region boundaries from the various band and combine them into one or more composite images that allow for high-accuracy, high-confidence segmentation. Another advantage of the approach is that it allows an empirical, data-driven approach to customizing segmentation for different object types and region types while requiring much less training data and training computation than is typically required for training neural networks and similar models.

To generate the profiles, the system can perform a selection process to identify the subset of wavelength bands of a hyperspectral image that allows more accurate segmentation of different region types. This process can include multiple phases or iterations applied to training examples. A first phase can assess the image data for individual bands, selecting the subset of individual bands that most distinctly show differences between the regions of interest (e.g., having the highest difference or most consistently show a difference between a particular region to be segmented and one or more other region types represented in the training data). A predetermined number of bands, or the subset of bands that satisfies certain criteria, can be selected for further assessment in a second phase. The second phase can involve generation of synthetic bands based on the application of different functions to the individual selected bands from the first phase. For example, if bands 1 and 2 were selected in phase 1, the system can generate several different candidate bands based on different ways of combining those two bands (e.g., band 1 minus band 2, band 1 plus band 2, normalized index of band 1 and band 2, etc.). The system can then evaluate how distinctly and consistently the normalized bands distinguish the region of interest from other regions, and select a subset of these synthetic bands (e.g., selecting a predetermined number having the highest scores, selecting those that have a region type discrimination score above a minimum threshold, etc.). The selection process can optionally continue with further phases to assess and select from different combinations of the synthetic bands, with each additional phase selecting new combinations that provide higher accuracy and/or consistency of discrimination of the region types of interest.

In the application of optical sorting and classification of plastics, the system can significantly improve the discriminating power of the system by generating combined or synthetic bands of image data and discovering which bands to use to detect different materials. For example, the analysis can be performed to determine which bands best discriminate between different base plastic types, as well as discriminating these from other common materials. Similarly, the analysis can be used to select the bands that best discriminate a base type of plastic without additives (e.g., pure PE) from that type of plastic with one or more additives (e.g., phthalates, bromides, chlorates, etc.), as well as for discriminating between regions that are uncontaminated from regions that have different types of surface contaminants. The selection of bands may be dependent on the type of base plastic, which sets the baseline amount of reflectance and variation in certain spectral regions. Thus different combinations of bands may be selected for identifying regions of different additives or contaminants are present. In some implementations, the band selection can be informed by the set of materials to be discriminated between and the specific types of additives and contaminants of interest.

In one general aspect, a method performed by one or more computers includes: obtaining, by the one or more computers, image data of a hyperspectral image, the image data comprising image data for each of multiple wavelength bands; accessing, by the one or more computers, stored segmentation profile data for a particular object type that indicates a predetermined subset of the wavelength bands designated for segmenting different region types for images of an object of the particular object type; segmenting, by the one or more computers, the image data into multiple regions using the predetermined subset of the wavelength bands specified in the stored segmentation profile data to segment the different region types; and providing, by the one or more computers, output data indicating the multiple regions and the respective region types of the multiple regions.

In some implementations, the different predetermined subsets of wavelength comprise different combinations of the wavelength bands, wherein each of the different combinations includes two or more of the wavelength bands.

In some implementations, the different predetermined subsets of wavelength bands comprise different pairs of the wavelength bands.

In some implementations, the accessed data specifies, for at least one of the region types, a combination of two wavelength bands that represents a difference between the image data for the two wavelength bands divided by a sum of the image data for the two wavelength bands.

In some implementations, the method includes: accessing data that indicates, for each of the different region types, one or more operations to be performed on image data for the predetermined subset of the wavelength bands that corresponds to the region type; and generating, for each of the different region types, a modified set of image data by performing the one or more operations corresponding to the region type on the predetermined subset of the wavelength bands that is designated for the region type; wherein segmenting the image data into multiple regions comprises using the modified set of image data for each region type to segment regions of the corresponding region type.

In some implementations, providing the output data comprises providing a set of image data for each region type, each of the sets of image data isolating regions of the corresponding region type.

In some implementations, at least one of the sets of image data includes image data derived from one or more wavelength bands different from the predetermined subset of wavelength bands used for segmentation of the region type.

In some implementations, the region types correspond to different materials.

In some implementations, the region types correspond to different conditions or an object.

In some implementations, providing the output data comprises providing the output data to a classification system configured to determine a classification for an object represented in the hyperspectral image.

In some implementations, the method includes using one or more of the segmented regions to determine a classification of or a condition of an object represented in the hyperspectral image.

In some implementations, wherein the image data represents one or more waste items; wherein the accessed segmentation profile data designates a subset of the wavelength bands for segmenting areas where a particular type of recyclable material is present; and wherein at least one of the multiple regions indicates an area where the recyclable material is present.

In some implementations, the method includes accessing segmentation profile data for multiple different plastics, and the accessed segmentation profile data indicates different subsets of the wavelength bands to use for segmenting the different plastics; wherein segmenting the image data into multiple regions comprises segmenting the image data into regions representing different plastics, wherein the regions for the different plastics are segmented using the respective subsets of the wavelength bands for the different plastics.

In some implementations, the method includes detecting at least one of a type of plastic, an additive for plastic, or a contaminant on a plastic based on the segmented image data. For example, the segmentation of a region corresponding to a region with a contaminant can indicate the presence of the contaminant. In some implementations, the segmented image data for the region, or feature values derived from the segmented data for the region, can be processed by a machine learning model to detect material properties, e.g., to classify a material, to identify a particular additive or contaminant, to estimate an amount or concentration of a chemical present, etc.

In some implementations, the method includes controlling machinery based on the segmentation performed using the segmentation profile data to sort or convey one or more objects described by the hyperspectral image data. For example, based on image data for the one or more objects being segmented as corresponding to a region type for a particular material, an instruction can be provided to the machinery to move the one or more objects to an area or container designated for objects of the particular material. As another example, the segmented image data can be used to generate input provided to a trained machine learning model, the resulting output of the machine learning model can be used to classify or label the one or more objects, and the classification or label can be provided to the machinery to cause the machinery to manipulate the one or more objects based on the classification or label.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
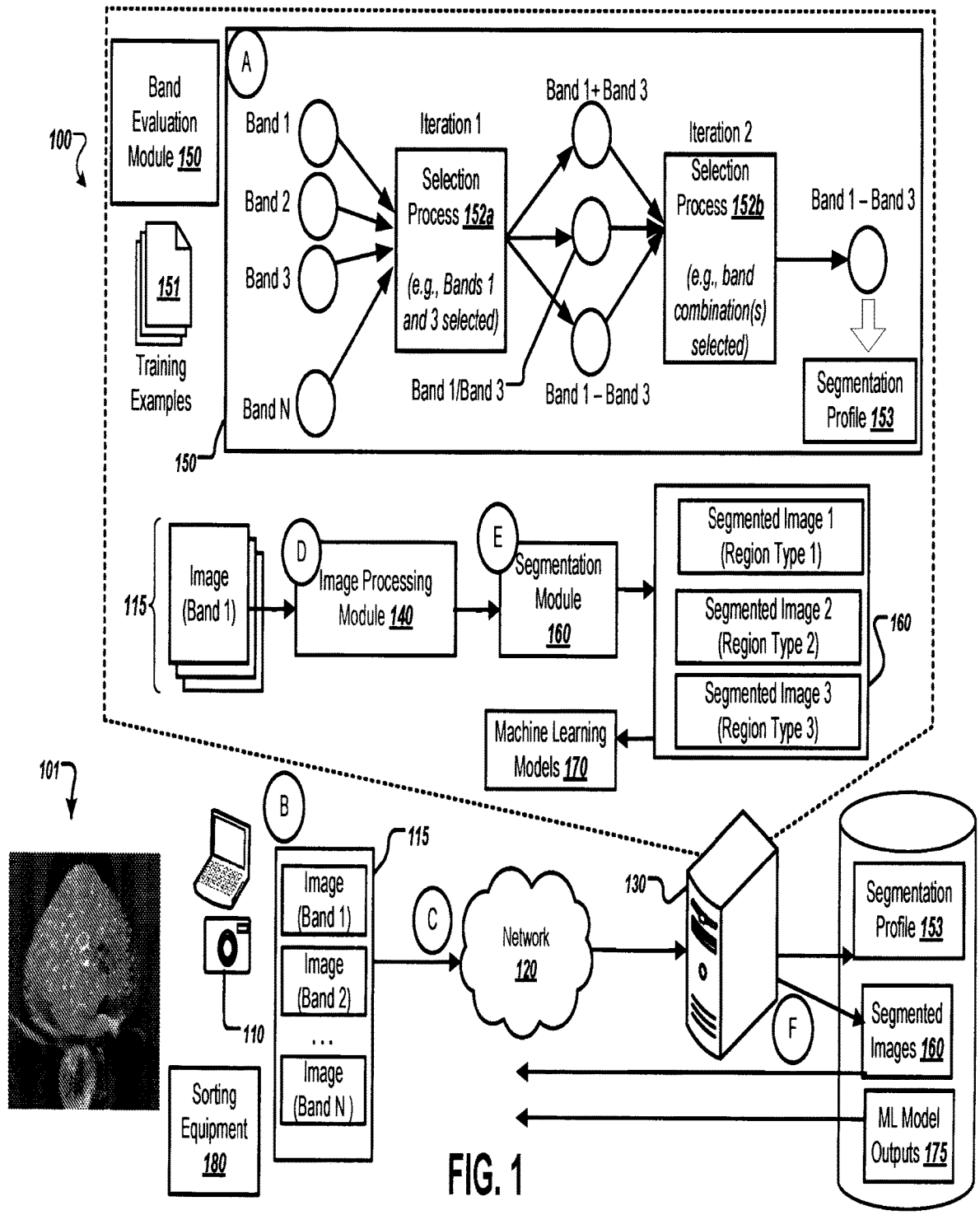
FIG. 1 is a block diagram illustrating an example of a system implemented to perform image segmentation using hyperspectral images.

FIG. 1 is a block diagram of an example system 100 implemented to perform band selection and image segmentation of a hyperspectral image. The system 100 includes a camera system 110 for capturing hyperspectral images of objects, such that each hyperspectral image comprises image data for each of multiple bands, where each band represents measurement of reflected light for a particular band of wavelengths. FIG. 1 further illustrates an example flow of data, shown in stages (A) to (E). Stages (A) to (E) may occur in the illustrated sequence, or they may occur in a sequence that is different than in the illustrated sequence.

The system 130 can be used to select bands used to perform image segmentation for many different applications. For example, the system can be used to select bands for identifying and evaluating different types of fruit, vegetables, meats, and other foods. As another example, the system can be used to select bands for identifying and evaluating waste materials, such as detecting the material type of recyclables as well as detecting the presence of additives or contamination and the amounts or concentrations of additives or contaminants.

In the example of FIG. 1 the camera system 110 takes hyperspectral images 115 of an object 101, which is a strawberry in the illustration. Each hyperspectral image 115 comprises image data for N bands. Generally, a hyperspectral image can be considered to have three dimensions, x, y and z where x, y represent the spatial dimension of a 2D image for a single band, and z represents an index or step through the number of wavelength bands. Thus, a hyperspectral image includes multiple two-dimensional images, where each image is represented by x and y spatial dimensions and each image represents the captured light intensity (e.g., reflectance) of the same scene for a different spectral band of light.

Most hyperspectral images have image data for each of several or even dozens of wavelength bands depending on the imaging technique. In many applications, it is desirable to reduce the number of bands in a hyperspectral image to a manageable quantity mainly because processing images with a high number of bands is computationally very expensive, resulting in delay in obtaining results and high power use. Many different dimensionality reduction techniques have been presented in the past such as principal component analysis (PCA) and pooling. However, these techniques often still carry significant computational cost, require specialized training, and do not always provide the desired accuracy in applications such as image segmentation. In addition, many techniques still attempt to use most or all bands for segmentation decisions, despite the different wavelength bands often having dramatically different information value for segmenting different types of boundaries (e.g., boundaries of different types of regions having different properties, such as material, composition, structure, texture, etc.). This has traditionally led to inefficiency of processing image data for more wavelength bands than are needed for a segmentation analysis. It has also limited accuracy as data for bands that have low relevance to a segmentation boundary obscure key signals in the data with noise and marginally relevant data.

In particular, the importance of different wavelength bands to a segmentation decision varies greatly from one type of region to another. Out of 20 different wavelength bands, one type of region (e.g., having a certain material or composition) may interact strongly with only a few of the total bands imaged, and a second type of region (e.g., having a different material or composition) may interact strongly with a different subset of the total number of bands imaged. Many prior systems did not have the ability to determine, store, and use region-dependent variations in which subsets of bands produced the best segmentation results, which often led to inefficient processing of band data that is marginally relevant or irrelevant to the segmentation of at least some regions of interest. As discussed below, the techniques discussed herein allow the segmentation parameters for each object type and region type to be determined based on analysis of training examples and stored, then used to better identify and distinguish each type of region of interest for a type of objects. This can be done for many different object types, enabling the system to select the profile for different objects or scenes and use the appropriate sets of bands and parameters to segment the various region types that may be present for different objects or scenes.

In the example of FIG. 1, the camera system 110 includes or is associated with a computer or other device that can communicate over a network 120 with a server system 130 that processes hyperspectral image data and returns segmented images or other data derived from the segmented images. In other implementations, the functions of the computer system 130 (e.g., to generate profiles, to process hyperspectral image data, to perform segmentation, etc.) can be performed locally at the location of the camera system 110. For example, the system 100 can be implemented as a standalone unit that houses the camera system 110 and the computer system 130.

The network 120 can include a local area network (LAN), a wide area network (WAN), the Internet or a combination thereof. The network 120 can also comprise any type of wired and/or wireless network, satellite networks, cable networks, Wi-Fi networks, mobile communications networks (e.g., 3G, 4G, and so forth) or any combination thereof. The network 120 can utilize communications protocols, including packet-based and/or datagram-based protocols such as internet protocol (IP), transmission control protocol (TCP), user datagram protocol (UDP), or other types of protocols. The network 120 can further include a number of devices that facilitate network communications and/or form a hardware basis for the networks, such as switches, routers, gateways, access points, firewalls, base stations, repeaters or a combination thereof.

In some implementations, the computer system 130 provides a band selection and image segmentation module that analyzes the image and provides as output the selected band configurations and the segmented images. In some implementations, the computer system 130 can be implemented by a single remote server or by a group of multiple different servers that are distributed locally or globally. In such implementations, the functions performed by the computer system 130 can be performed by multiple distributed computer systems and the machine learning model is provided as a software service over the network 120.

Figure 2:
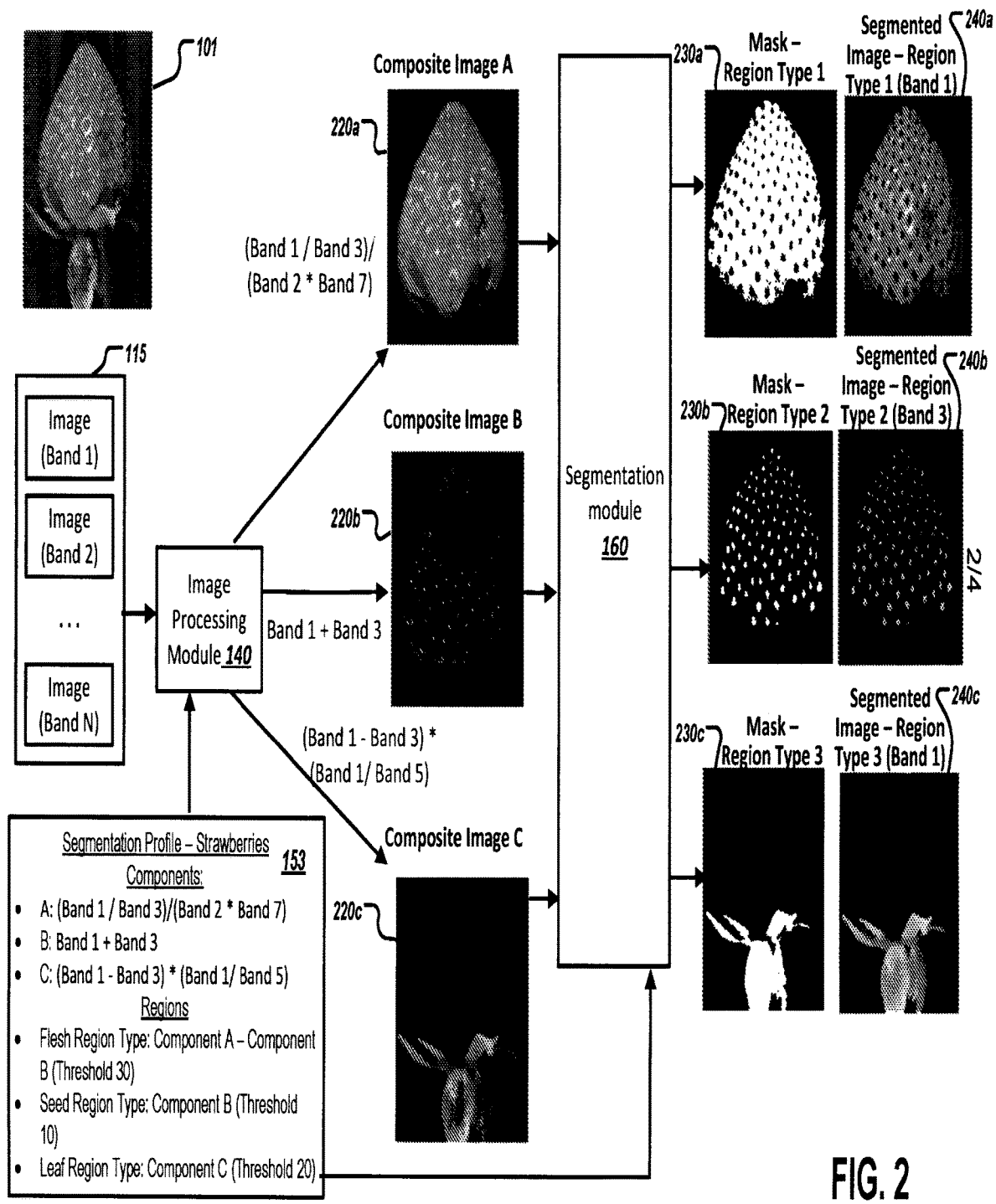
FIG. 2 is a diagram illustrating an example of performing enhanced image segmentation using a profile to select different subsets of wavelength bands of a hyperspectral image to segment different types of regions of an object.

Briefly, FIG. 1 shows an example where the computer system 130 generates segmentation profiles for object types and/or region types through analysis of various training examples. The computer system 130 then receives an additional hyperspectral image and uses the profile for the object type of an object in the image to efficiently generate an accurate segmentation result. While FIGS. 1 and 2 illustrate a strawberry as the type of object to be detected and evaluated, the same techniques described can be used to process other types of objects.

During stage (A), as a setup process, the computer system 130 generates a profile for a type of object for which images are to be segmented. For example, to enable the system to segment images of strawberries, a profile 153 for the strawberry object type can be created. The profile 153 can specify a subset of bands to use when segmenting strawberries, or more potentially even different bands to use for segmenting different types of regions of strawberries.

To generate the profile for an object type, the computer system 130 processes various training examples 151 that include hyperspectral images of instances of the object type to be profiled. In some implementations, the band evaluation module 150 performs a band selection process in which each of the bands of processed hyperspectral images are analyzed to generate a selected band configuration that enables high accuracy while performing hyperspectral image segmentation.

The band evaluation module 150 can perform an iterative process of band selection 152 for object types and/or region types. During the first iteration, the individual bands of the hyperspectral images undergo a selection process 152*a*. The process 152*a* selects a subset of bands from the multiple bands of the hyperspectral training images. For example, during the first iteration, the module 150 evaluates the bands 1 to N of the various hyperspectral image training examples 151, giving a score to each band indicating how well the band discriminates between a particular type of region of interest (e.g., flesh of a strawberry) and other regions (e.g., leaves, seeds, background, etc.). In the example, the first iteration of the process 152 selects band 1 and band 3 from bands 1 to N.

In some implementations, after the selection of the subset of individual bands, synthetic bands or altered bands are generated. The synthetic bands can be generated by processing the image data for one or more of the bands selected in the first iteration. For example, each band within the subset of bands can undergo one or more operations (e.g., image processing operations, mathematical operations, etc.), which can include operations that combine data from two or more different bands (e.g., of those selected in the first iteration). Each of various predetermined functions can be applied to the image data for different combinations of the selected bands (e.g., for each pair of bands or each permutation within the selected subset of bands). This can create a new set of synthetic bands each representing a different modification to or combination of bands selected in the first iteration. For example, upon selection by the selection process 152*a*, the module 150 performs operations on band 1 and band 3 to create three new synthetic bands comprising: (1) band 1+band 3; (2) band 1/band 3; and (3) band 1−band 3.

The synthetic bands created in this manner are then evaluated, for example, scored to determine the level with which they each discriminate between a region type of interest (e.g., flesh of a strawberry) and other region types. The computer system 130 then selects from among the synthetic bands in a selection process 152*b* for the second iteration. In the example, the synthetic band created as band 1−band 3 is selected by the process 152*b*. The iterative process of generating new modified or composite bands and then selecting the most effective among them can continue until a desired level of accuracy is reached.

In the example, the information for segmenting flesh of a strawberry is distilled or aggregated into a single 2D image. However, this is not required, and in some implementations, the profile 153 may indicate that multiple separate bands (e.g., original or synthetic/modified) should be generated and used for segmentation. For example, the system may specify that segmentation should use image data for three bands, band 1+band 3, band 1/band 3, and band 1−band 3.

The band evaluation module 150 performs the selection process for each of the multiple region types of the type of object for which the profile 153 is being generated. This produces, for each region type, a selected subset of bands to be used for that region type. When the selected bands are synthetic bands, the component input bands and the functions to be applied to generate the synthetic bands are stored in the profile. The result is that the profile 153 for an object type may include a selected band configuration to be used for each region type of the object, enabling high accuracy for image segmentation for each of the region types. For example, for a profile 153 for segmenting strawberries, the region types may be leaves, seeds, and flesh. As another example, in a profile for segmenting elements of dining rooms, the multiple region types may include chairs as the first region, tables as the second region, and walls as the third region.

In some implementations, the region types for the profile 153 represent regions of different materials, so that segmentation can facilitate distinguishing among regions of different materials an image. The band evaluation module 140 generates a band configuration for each material type to enable high accuracy while performing image segmentation. For example, for assessing furniture, the multiple material types include wood, plastic, and leather. More generally, the selection can determine the image band parameters for any of various properties, including material, composition, texture, density, structure, and so on.

In some implementations, the band evaluation module 150 performs band selection process 152 for each of the multiple condition types of the object. For example, the flesh of a strawberry may be considered to have regions of different types, such as ripe, unripe, bruised, mildewed, etc. The band evaluation module 150 can generate and store in the profile 153 a band configuration for each type of condition that enables high accuracy of distinguishing regions of the different conditions while performing image segmentation.

The process of generating profiles discussed for stage (A) can be performed for many different object types, to create a library of segmentation profiles 153 that are stored and can be retrieved by the system 130 to accurately segment each of the different object types. For each object type, there may be multiple different region types specified, each having corresponding wavelength bands, operators, algorithms, and other parameters specified to be used for segmenting image regions of that region type.

During stage (B), the camera system 110 captures a hyperspectral image of an object. For example, the camera system 110 takes a hyperspectral image 115 of a strawberry 101 that includes image data for each of N different wavelength bands. In some implementations, the hyperspectral image 115 can be sent as one of many in a series of images of different objects, such as objects on a conveyor for manufacturing, packaging, or quality assurance.

During stage (C), the hyperspectral image 115 is transmitted from the camera system 110 to the computer system 130, for example, using the network 120. The hyperspectral image 115 can be transmitted in association with a request for processing the image, such as to generate a segmented image, to examine the characteristics or quality of an object represented in the image, or for another purpose.

During stage (D), upon receiving the hyperspectral image 115, the computer system 130 performs processing to identify and generate the image data needed for the different types of regions to be segmented. This can include pre-segmentation steps of identifying an object type represented in the hyperspectral image 115, retrieving the profile 153 for the object type (e.g., from a database and from among profiles for multiple different object types), pre-processing the image data for different bands (e.g., generating synthetic or composite images, applying thresholds, functions, or filters, etc.), reducing the number of images (e.g., projecting or combining image data from multiple bands into fewer images or a single image), and/or otherwise preparing the hyperspectral image 115 for segmentation processing with the parameters in the profile 153.

The computer system 130 identifies the object type of the object 101 represented in the hyperspectral image 115, then selects and retrieves the segmentation profile 153 corresponding to that image type. Data provided in connection with the hyperspectral image 115 can indicate the type of object 101 represented in the image. For example, a request for processing the hyperspectral image 115 can include an indication that the object to be evaluated is of the "strawberry" object type. As another example, the system 100 may be arranged to repeatedly process hyperspectral images showing the same type of object, so that the computer system 130 is already configured to interpret or process the incoming hyperspectral image 115 as an image of a strawberry. This may be the case in a manufacturing facility or packaging workflow where items of the same type are sequentially processed. In yet another example, the computer system 130 may use an object recognition model to detect a type of object represented in the hyperspectral image 115, and then select the profile corresponding to the automatically identified object type.

With the appropriate profile 153 selected for the object type of the object pictured in the hyperspectral image 115, the computer system 130 applies the information in the selected profile 153 to process the hyperspectral image 115. For example, the profile 153 may specify different composite or synthetic images to generate from the image data for different bands in the hyperspectral image 115. The computer system 130 may generate these images, as well as apply any other algorithms or operations the profile specifies. As a result, the module 140 prepares one or more images on which the segmentation processing is applied. In some cases, this may result in a single 2D image, or different 2D images for each of various different region types to be segmented, or multiple 2D images for each of multiple different region types. In effect, the module 140 can act as a pre-processing stage, using the profile 153 to filter out image data for bands that are not relevant to a given region type and processing the image data to an appropriate form for segmentation.

During stage (E), the segmentation module 160 performs segmentation based on the processed image data from the image processing module 140. Segmentation can determine the boundaries of different objects and different types of regions of those objects. One way to look at the segmentation process is that the module 160 can classify the different areas of the images it received (which represent the corresponding hyperspectral image 115) into classes or categories, e.g., assigning pixels as one of various types, background or not part of the object, leaves, seeds, flesh, etc. For example, the image data for selected band configuration, as generated by the image processing module 140, can have any of various segmentation algorithms applied, such as thresholding segmentation, clustering segmentation, compression-based segmentation, histogram-based segmentation, edge detection, region-growing techniques, partial-differential equation-based methods (e.g., curve propagation, parametric methods, level-set methods, fast marching methods, etc.), graph partitioning segmentation, watershed segmentation, model-based segmentation, multi-scale segmentation, multi-spectral segmentation, and so on. The segmentation algorithms can use parameters (e.g., thresholds, weights, references, different models or model training states, etc.) specified by the profile 153 for each region type, so that different segmentation parameters or even different segmentation algorithms may be used to identify different region types. The results of segmentation can be expressed as an image. One example is an image that provides 2D pixel grid, where pixels are given a value of "1" when they correspond to a particular region type (e.g., leaves) and given a value of "0" otherwise.

In the example, the profile 153 specifies three region types, leaves, seeds, and flesh of a strawberry. The profile 153 specified these three regions to be segmented as well as the bands and parameters to use in identifying where these three regions are present. The segmentation module 160 generates an output 160 that includes three images, one for each of the three different region types. Each image thus corresponds to a different region type and specifies the areas, out of the 2D field of view of the hyperspectral image 115, that is occupied by instances a particular region type. In other words, the segmented images can include an image mask or otherwise specify boundaries of the regions where a certain region type is identified to be present. In some cases, areas of different region types can be specified all in a single image, with different values classifying different pixels as corresponding to different regions (e.g., 0 for background or not part of the object, 1 for leaves, 2 for seeds, 3 for flesh of the strawberry, etc.).

During stage (F), the system 130 stores the segmentation results 160 and uses them to generate and provide output. Even though the segmentation boundaries were generated using image data for a subset of the bands in the hyperspectral image 115, the boundaries determined can be used to process the image data for each of the bands of the hyperspectral image 115. For example, a hyperspectral image may have image data for 20 different bands, and the segmentation process may use image data for only bands 1 and 2. The resulting region boundaries determined may then be applied to segment or select the defined regions in image data for all 20 of the different bands. Because the images for different bands of the hyperspectral image 115 share the same view and perspective of the object 101, segmentation based on image data for one band can be directly applied (e.g., overlaid, projected, or otherwise mapped) to the image data for the other bands. This way, the segmentation can be applied consistently across all of the images within the hyperspectral image 115.

The segmentation results 160 can be stored in a database or other data storage, in association with a sample identifier for the object 101 and with the hyperspectral image 115 captured. For quality control and manufacturing uses, the system 130 can use the association as part of detecting and logging defects, tracking quality and characteristics of specific objects as they move through a facility, assisting with sampled analysis of a lot or batch of objects, and so on. Some of the common functions that the system 130 can use the segmented hyperspectral image data to perform include characterizing the object 101 or specific portions of it, such as assigning scores for the composition, quality, size, shape, texture, or other properties. Based on these scores, or potentially as a direct output of image analysis without intermediate scores, the computer system 130 can classify objects based on the segmented hyperspectral image data. For example, the system 130 can sort objects into categories, such as different quality grades, and direct them with a conveyor system to different areas based on the categories assigned. Similarly, the system 130 can detect objects with defects and remove them from a manufacturing or packaging pipeline.

The segmentation results 160, results of applying the segmentation to the hyperspectral image 115, and/or other information generated using them can be provided. In some implementations, one or more images indicating the segmented boundaries are transmitted to the camera system 110 or another computing device for display or further processing. For example, the boundaries of different region types determined through segmentation can be specified in annotation data that overlays the region boundaries and indicates region types for the hyperspectral image 115 or for a composite image or standard color (e.g., RGB) image of the object 101.

In some implementations, the computer system 130 performs further processing on the segmented images, such as to generate input feature values from the pixel values for certain segmented regions and provide the input feature values to a machine learning model. For example, a machine learning model may be trained to classify objects such as strawberries based on characteristics such as size, shape, color, consistency of appearance, absence of defects etc. The computer system 130 may use the region boundaries determined through segmentation to isolate, from the hyperspectral image 115, the image data for various spectral bands that correspond to an individual strawberry and/or to specific types of regions of the strawberry. Thus the computer system 130 can provide, as input to a trained machine learning model, an input image that excludes background elements and other objects and instead provides only the regions that are showing part of the strawberry, or only provides regions that show a certain part of the strawberry (e.g., flesh of the strawberry, omitting the seeds and leaves).

In some cases, the input provided to a machine learning model can be derived from segmented images, without providing image data itself to the model. Examples include the ratio of a number of pixels classified as one region type to pixels classified as being of another region type (e.g., amount of seed region pixels to an amount of flesh region pixels), an average intensity (potentially for each of various spectral bands) of pixels segmented to be of a certain region type (e.g., flesh of the strawberry), and a distribution of intensities of pixels segmented as being of a certain region type.

Machine learning models 170 can be trained to perform various different functions, such as to classify the condition of an object or estimate characteristics of the object. For a strawberry, the machine learning models may use segmented input image data to determine a classification (e.g., good condition, unripe, bruised, mildewed, etc.). Machine learning models can also be trained to provide scores or classifications for hyperspectral-image-based prediction of specific properties, such as chemical content, strength, defect type or defect density, texture, color, and so on. For example, one or more models can be trained to predict the amount or concentration of a chemical that is present in an object. One example is a model trained to non-destructively predict the concentration of sugar in the juice from a strawberry, e.g., in degrees Brix or mass fraction, based on input features indicating properties of hyperspectral imaging data for the strawberry. The model can be trained based on examples of hyperspectral images of strawberries and corresponding sugar content that is measured, so that the examples indicate the relationships between the reflectance levels in different spectral bands and the sugar content present. The same training and modeling techniques can be used to generate models that predict the amount or concentration of other chemicals, as well as to predict chemicals in other fruits, foods, and non-food objects.

The machine learning models 170 can be neural networks, classifiers, decision trees, random forest models, support vector machines, or models of other types. The results of machine learning models processing segmented hyperspectral image data or input features derived from the hyperspectral image data can be stored in a database for later use and may be provided to any of various devices, e.g., to a client device for display to a user, to a conveyor system to direct the object 101 to one of multiple locations, to a tracking system, etc. For example, the results of machine learning models that classify an object 101 can be used to generate instructions sent to sorting equipment 180 (e.g., causing the sorting equipment 180 to physically move or group objects according to the characteristics indicated by the machine learning model results), to packaging equipment to specify how and where to package the object 101, to robotic arms or other automated manipulators for moving or adjusting the object 101, or otherwise manipulating the object 101.

The techniques of FIG. 1 can also be applied to assess other types of materials, such as plastics and other recyclables. For example, the techniques may be used to improve the efficiency and accuracy of characterizing chemical or material identities of waste materials, allowing items to be sorted by material type, presence and amount of additives, presence and amount of contaminants, and other properties determined through computer vision. This analysis can be used to improve both mechanical and chemical recycling processes.

Mechanical recycling is the dominant strategy for recycling plastic and involves grinding, melting, and re-extruding plastic waste. Recycling facilities are frequently designed to process streams of sorted materials with high purity, to retain a high level of material performance in recycled products. However, feedstock impurity reduces the effectiveness of recycling, due to complex formulations with additives, as well as the physical degradation of materials, even just after a few cycles of mechanical recycling. For example, with plastic materials, polylactic acid (PLA) is a common waste plastic often undetected in polyethylene terephthalate (PET) sorting and mechanical recycling operations. As another example, chlorinated compounds such as polyvinyl chloride (PVC) are not tolerated in both mechanical and chemical recycling operations, because corrosive compounds are produced during recycling processes, which limits the value of hydrocarbon outputs.

Mechanical recycling is limited in its applicability to mixed, composite, and contaminated waste streams, in part because it employs mechanical separation and reformation processes that are insensitive to chemical contaminants and may be unable to modify the chemical structure of waste material. The system 130 can improve the effectiveness of mechanical recycling through improved identification and classification of plastics and other materials, leading to more accurate sorting of materials and thus higher-purity, more valuable recycling feedstock. In addition, the system 130 can use imaging data to detect the presence and type of additives and contaminants, allowing materials with these compounds present to be processed differently or removed.

Chemical recycling may resolve some limitations of mechanical recycling by breaking the chemical bonds of waste materials into smaller molecules. For example, in the case of polymeric materials, chemical recycling may provide an avenue to recover oligomers, monomers, or even basic molecules from a plastic waste feedstock. In the case of polymers, chemical recycling processes may include operations to depolymerize and dissociate the chemical makeup of a complex plastic product, such that its by-products can be up-cycled into feedstocks for new materials. Elements of chemical recycling may permit a material to be repeatedly dissociated into primary feedstock materials. In this way, rather than being limited by chemical structure and material integrity to a limited number of physical processes, as in mechanical recycling, chemical recycling may be integrated into an 'end-to-end' platform to facilitate reuse of molecular components of recyclable materials. For example, the products of chemical recycling may include basic monomers (ethylene, acrylic acid, lactic acid, vinyl, etc.), feedstock gases (carbon monoxide, methane, ethane, etc.), or elemental materials (sulfur, carbon, etc.). Instead of being limited to a single group of recycled products, based on the molecular structure of the input waste material, products may be identified that can be synthesized from intermediary chemicals that can be produced from the waste by chemical reactions. In so doing, the end-to-end platform may manage a waste stream by generating a chemical reaction scheme to convert the waste material into one or more target products. For example, the end-to-end platform may direct a waste feedstock to a chemical recycling facility, for chemical conversion of the waste material into a target product.

The capabilities of the system 130 can also improve the effectiveness of chemical recycling. For example, the system 130 captures hyperspectral images of a waste stream on a conveyor belt and uses the techniques of FIG. 1 to detect which materials are present. The system 130 can also estimate the amounts of different materials that are present, e.g., based on the size and shape of different types of regions identified, and the proportions of different materials present. The system 130 can also detect which additives and contaminants are present. From this information about the composition of the waste stream, the system 130 can modify or update chemical processing parameters to change target product quantities, endpoints, or chemical structures. Some of these parameters can include changes in the conditions of processing (e.g., residence time, reaction temperature, reaction pressure, or mixing rates and patterns) as well as the types and concentrations of chemical agents used (e.g., include input molecules, output molecules, catalysts, reagents, solvents). The system 130 can store a table, equation, model or other data that specifies processing parameters for different input types (e.g., different mixes or conditions of input materials), and the system 130 can use the stored data to determine the instructions to processing machinery to implement the needed processing conditions. In this manner, the system 130 can use analysis of hyperspectral imaging data of a waste stream to adjust the chemical recycling processing parameters so that they match the material characteristics of the waste stream. The monitoring can be performed on an ongoing basis, so that as the mix of materials in a waste stream changes, the system 130 varies the processing parameters appropriately for the incoming mix of materials.

As an example application of the technique shown in FIG. 1 to recycling, the camera system 110 can be arranged to capture hyperspectral images of waste materials as the object 101 being imaged. In some implementations, the camera system 110 is arranged to capture hyperspectral images of waste materials on a conveyor. The waste material may include many objects of different types and compositions imaged in a single image. Results of processing the images are used to generate instructions for equipment to sort the waste material and optionally mechanically or chemically process the waste material.

During stage (A), as a setup process, the computer system 130 generates a profile for one or more types of materials of interest. Different profiles can be generated for different plastic types (e.g., PE, PET, PVC, etc.). Information to facilitate segmentation and detection of additives and contaminants can be included in the basic material profiles or in other profiles. For example, in this application, the profile 153 shown in FIG. 1 may represent a profile for PET and can indicate a subset of spectral bands to use when segmenting regions PET. The profile 153 may also indicate different subsets of bands to respectively use for segmenting different types or variations of PET, or for segmenting regions with different types of additives or contaminants.

Using the techniques discussed above, the computer system 130 generates a profile for a material by processing various training examples 151 that include hyperspectral images of instances of the material to be profiled. The training examples can include examples showing a target material to be identified (e.g., PET) in the presence of various other different materials, including other waste materials such as other types of plastics. The training examples 151 can include at least some examples of images of the material with regions where additives or contaminants are present, so the system 130 can learn which bands and properties distinguish a clean or pure region of the material from regions where various additives or contaminants are present.

The band evaluation module 150 performs a band selection process in which each of the bands of processed hyperspectral images are analyzed to generate a selected band configuration that enables high accuracy for segmenting the desired material from other types of materials, especially other types of plastic and other waste materials likely to be imaged with the material of interest. As discussed above, the band evaluation module 150 can perform an iterative process of band selection 152 for each of multiple different material types and/or region types. For segmentation of regions for different base plastic types, the system 130 can use principal component analysis or support vector machines (SVMs) to determine the change or difference between different pixel groups resulting from using different bands to discriminate between materials. In some cases, the pixel intensities for each type of plastic can be clustered together and the difference between the clusters (e.g., between average values for the cluster) can be determined. In general, the band selection analysis can attempt to maximize the difference or margin between pixel groups for different materials. For example, to distinguish between PE, PET, PVC, and PP, the band evaluation module 150 can assess the differences in pixel intensities in different spectral bands and identify bands that provide the greatest and most consistent amount of difference (e.g., margin) between the reflected intensity for the different plastics. For example, the band evaluation module 150 may determine that a first band has similar average reflectance for each of the four plastic types above, but that a second band shows a greater amount of difference in reflectance for at least some of the plastic types. The analysis may be done in a pairwise manner to identify which bands are most effective at distinguishing between which pairs of materials. In various iterations, the band selection module 150 can select the bands with the greatest discriminating power (e.g., highest margin between pixel intensity groupings) and make different combinations of these to generate synthetic bands that are in turn evaluated in the same manner, until a maximum number of iterations is reached or the margin meets a minimum threshold for discriminating ability. This process can similarly be used to determine the bands and synthetic bands that best distinguish plastics with additives or contaminants from pure base plastics.

As a result of the band selection, the system 130 may determine, for example, that a first subset of bands provides the best discrimination of a desired plastic type (e.g., PET)

from other plastics or waste materials and that a second, different subset of bands is most effective for segmenting a certain additive or contaminant (e.g., oil as food residue). This can include generation of and evaluation of synthetic bands that combine data from multiple different spectral bands of the original hyperspectral image. This results in a repository of profiles for different materials, each indicating the best parameters and subsets of bands that the system identified for distinguishing a target material from other materials it is likely to be near.

Continuing the application of the technique of FIG. 1 to the recycling application, during stage (B), the camera system 110 captures a hyperspectral image of a waste stream. For example, the camera system 110 takes a hyperspectral image 115 of a waste stream on a conveyor on its way to sorting or other processing. During stage (C), the hyperspectral image 115 is transmitted from the camera system 110 to the computer system 130, for example, using the network 120. The hyperspectral image 115 can be transmitted in association with a request for processing the image, such as to generate a segmented image, to identify the materials represented in the image 115, to determine the amount of one or more particular materials represented by the image, to assess the level or type of contamination of a sample, or for another purpose.

During stage (D), the computer system 130 retrieves the profiles for different types of materials to be identified in the hyperspectral image data 115. Based on the information in the profiles, the computer system 130 selects bands and or generates synthetic bands of image data for identifying each different type of region to be detected. For example, the profiles can specify different sets of bands for different plastic types, and also for different additives and contaminants. For example, one set of bands may be used for segmenting clean PET regions, another set of bands for segmenting oil-contaminated PET regions, a third set of bands for segmenting regions of PET having a particular additive, and so on.

During stage (E), the segmentation module 160 performs segmentation based on processed image data from the image processing module 140. For plastic recycling, the segmented areas can be areas of different plastic types (e.g., PET, PE, PVC, etc.) as well as regions where additives or contamination are present (e.g., PE with oil contamination, PET with a UV-resistant additive, etc.). The system 130 can perform further processing to interpret the segmented results, such as to count the number of different items or regions of each type, to determine the areas covered by each region type (e.g., as indicator for the amount and proportions of the different materials), and so on.

During stage (F), the system 130 stores the segmentation results 160 and other data characterizing the regions imaged. The system 130 can store metadata that marks specific objects or regions in the imaged area (e.g., waste material on a conveyor) with the material type determined through the segmentation analysis. The boundaries of different regions, as well as the area or proportion of different region types can be stored as well. The system 130 can then use this information to generate instructions for processing the waste material. For example, the system 130 can provide the information to a mechanical sorting machine to direct different pieces of plastic to different bins, conveyors, or other devices according to the type of plastic detected. As another example, the system 130 can identify plastic items that have one or more additives and separate them from plastics without the additives. Similarly, the system 130 can identify items that have at least a minimum amount of contamination (e.g., at least a minimum area with a contaminant present) and remove these items to avoid contaminating the rest of the recycling feedstock. More generally, the system 130 can use the segmented hyperspectral image data to characterize various properties of the waste material, such as assigning scores for any of various properties of materials detected. Based on these scores, or potentially as a direct output of image analysis without intermediate scores, the computer system 130 can classify portions of the waste materials or classify the set of waste materials as a whole.

As discussed above, the segmentation results 160, results of applying the segmentation to the hyperspectral image 115, and/or other information generated using them can be provided to other devices for display or further processing. Segmented images can also be used by the computer system 130 or another system to generate input for one or more machine learning models. For example, the computer system 130 can generate input feature values from the pixel values for certain segmented regions and provide the input feature values to a machine learning model. For example, a machine learning model may be trained to classify an item or a set of items as recyclable or not based on the type of plastic and amount and types of additives and/or contamination present. The computer system 130 may use the region boundaries determined through segmentation to isolate, from the hyperspectral image 115, the data that is respectively for regions of different material types, different additives, or different contaminants. In some cases, information from the hyperspectral image data for segmented regions may be indicative of further characteristics of the material, e.g., the density, thickness, quality of material, etc., that may be relevant to a classification decision. Thus the computer system 130 can provide, as input to a trained machine learning model, one or more input images that excludes background elements (e.g., the belt of the conveyor) and other objects not of interest and instead provides only the regions that are relevant to the classification decision of the model. The bands of information provided may be different from those used for segmentation. The spectral bands that best distinguish a material from other materials may be quite different from the spectral bands that indicate properties of the material or distinguish between different states or variations of that material.

The segmented hyperspectral image data may be processed by trained machine learning models or other computational methods, such as procedural or rules-based models, to look for patterns in the signals related to material signatures, additive or contaminant signatures, or other information indicative of chemical type, composition, morphology, structure, or purity. In materials incorporating multiple different additives, contaminants, or impurities with a main material, such as recycled PET objects of different forms including diverse plasticizers as are often received by a recycling facility, data for multiple region types can be provided. Data for multiple bands of interest can also be provided, including image data for subsets of the spectral bands that exclude those that are less informative due to having similar properties across many forms of recycling feedstock materials. As an example, a classifier implementing an SVM trained to classify materials may be provided with data for certain bands of interest, with segmented regions of different types marked or otherwise indicated.

The machine learning models can be used to predict the amount or concentration of different chemicals, such as additives and contaminants. In the case of analyzing plastics, with an appropriate set of training data and sufficient training iterations, one or more models can be trained to predict a mass fraction of each of different additives or contaminants at an accuracy that matches or exceeds the level provided by typical destructive testing. The models can then be provided inputs, based on the hyperspectral data in one or more segmented regions, so that the models produce outputs that indicate a predicted (e.g., inferred or estimated) level of content of one or more chemicals that the models have been trained to predict. For example, different models can each provide a regression output (e.g., a numerical value) that indicates mass fraction for different additives or contaminants. As another example, a model can generate an estimate for the amount of a chemical present (e.g., in grams, moles, or other appropriate unit), which can be indicated by the amount of area where the chemical is present, the spectral properties that indicate concentration and variations in concentration over an area, and so on. As another example, models can classify objects or regions based on the amount or concentration of a chemical present (e.g., assigning a first classification for a first range of concentrations, assigning a second classification for a second range of concentrations, etc.). The types of measurements output in the predictions can be the same type used as ground truth labels in the training of the models.

Different classifiers can be trained to predict different chemical properties based on information from different spectral bands and based on different segmented region types. For example, a first classifier can be configured to predict the amount or concentration present for a first contaminant. The input provided to the first classifier can be derived from a region segmented as having the first contaminant present, and in that segmented region only data for a predetermined set of spectral bands (e.g., bands 1, 2, 3, 4) is used to generate the input to the first classifier. A second classifier can be configured to predict the amount or concentration present for a second contaminant. The input provided to the second classifier can be derived from a region segmented as having the second contaminant present, and in that segmented region only data for a second predetermined set of spectral bands (e.g., bands 1, 3, 5, 7) is used to generate the input to the second classifier. Thus different contaminants, additives, and other chemicals can be predicted with models that use the specific spectral bands that are most relevant to the chemical being assessed and use input focused on segmented spatial regions that are most relevant.

In some cases, the input provided to a machine learning model can be derived from segmented images, without providing image data itself to the model. Examples include the ratio of a number of pixels classified as one region type to pixels classified as being of another region type (e.g., an amount of pixels showing plastic to pixels showing non-plastics, a ratio of pixels representing PET to pixels representing PE, an amount of pixels for clean PET to an amount of pixels representing contaminated PET), an average intensity (potentially for each of various spectral bands) of pixels segmented to be of a certain region type and a distribution of intensities of pixels segmented as being of a certain region type. The output of any of the machine learning models can be used by the system 130 to control machinery for sorting and processing waste materials. For example, this may be done by labeling an item with metadata indicating a classification, or by generating instructions and sending them to a sorting device to manipulate a particular item in a specified way.

In some embodiments, the waste material that is imaged and analyzed may include, but is not limited to, polymers, plastics, composite materials containing plastics, non-plastics, ligno-cellulosic materials, metal, glass, and/or rare-earth materials. The polymeric and plastic materials may include materials formed by one or more polymerization processes and may include highly cross-linked as well as linear polymers. In some cases, the waste material may include additives or contaminants. For example, a plastic material may include a plasticizer, flame retardant materials, impact modifiers, rheology modifiers, or other additives included in the waste material 111, for example, to impart desired properties or facilitate formation properties. In some cases, the waste material may incorporate a constituent chemical or element that may be incompatible with a broad range of chemical recycling processes, and, as such, the characterization data 113 may include information specific to such chemicals. For example, decomposition of halogen or sulfur containing polymers may produce corrosive byproducts that may inhibit or impair chemical recycling of waste materials that include such elements. An example of a waste material containing a halogen constituent is polyvinyl chloride (PVC). Decomposition of PVC, for example, may generate chlorine containing compounds that may act as corrosive byproducts.

FIG. 2 is an example diagram illustrating the segmentation of region types based on the band configuration specified by the profile 153. FIG. 2 provides additional detail, continuing the example of FIG. 1, where a strawberry is the object 101 being imaged, and a profile 153 has already been defined to specify the subsets of bands to be used for segmenting different region types within strawberries. Here, the profile specifies three different composite or synthetic images to create for use in segmentation, labelled as components A, B, and C, each of which is derived from the image data of two or more bands of the hyperspectral image 115. Of course, a profile is not required to specify images that combine multiple bands and may instead in some cases simply specify selected original bands from the hyperspectral image 115 for which image data should be passed on to the segmentation module 160. As directed by the profile 153, the image processing module 140 generates various composite images 220a-220c which are then used by the segmentation module to generate masks 230a-230c showing segmentation results (e.g., areas or boundaries of areas determined to correspond to different region types). The masks can then be applied to some or all of the images for different bands of the hyperspectral images.

The system 100 takes advantage of the fact that regions with different composition, structure, or other properties can have very different responses to different wavelengths of light. In other words, two different regions of different types (e.g., seeds vs. leaves) may respectively reflect light strongly for different bands. For example, a first band may be mostly absorbed by a first region type (e.g., seeds) while being reflected much more strongly by a second region type (e.g., leaves), making it a good band to use when segmenting the second region type (e.g., leaves). In this example, the different reflectance characteristics, captured in the image data showing intensity values captured for the first band of light, tends to at least partially diminish or remove the regions of the first type, leaving a signal that more strongly corresponds to the second region type. A different band may demonstrate the opposite, with the first region type having a higher reflectance than the second region type. In many instances, however, the level of differential reflectance of two region types is not as stark as illustrated. In particular, the regions of different types may not be able to be distinguished effectively based on only a single spectral band.

The band evaluation module 140 takes as input, the hyperspectral image 115 and uses the profile 153 to determine the band configuration to use for each of the three different region types. For example, the band evaluation module 140 generates three composite images 220a-220c. The flesh and seeds are shown most prominently by composite image A, generated by (Band 1+Band 3)/(Band 1−Band 3); the seeds of the strawberry are shown most prominently in composite image B (Band 1+Band 3); and the leaves of the strawberry are shown most prominently with band configuration (Band 1−Band 3)/(Band 1/Band 5). In each of these, the reference to the band references the image data for that band, so that, for example, "Band 1+Band 3" represents a sum of the image data for both bands 1 and 3 (e.g., summing the pixel intensity value for each pixel in the Band 1 image with the corresponding pixel intensity value for the image for Band 3). The profile 153 can specify the transformations and aggregations of image data for different bands that best emphasize different region types, or more particularly, emphasize the differences between different region types to make the boundaries more distinct for segmentation.

The segmentation module 160 also receives information from the profile 153, such as an indication of which bands or combinations of them to use for segmenting different region types, and which other parameters to use for the different region types (e.g., threshold values, which algorithms or models to use, etc.). The segmentation module 160 carries out the segmentation operations and can determine a mask 230a-230c for each region type of interest. Each mask for a region type identifies the areas that correspond to that region type (e.g., designates pixels that are classified as depicting that region type). As can be seen in the mask 230a, the segmentation process can remove the seeds, leaves, and background leaving the regions where the flesh of the strawberry is shown clearly identified. The masks 230a-230c can then each be applied to any or all of the images in the hyperspectral image 115 to generate segmented images, for example, images 240a-240c that show the variation in intensity values for the respective bands, but limit the data to image data corresponding to a desired region type.

As discussed above, the segmentation results can be used to evaluate the object 101, such as to determine if the shape, size, proportions, or other properties satisfy predetermined criteria. The segmented regions can also be provided for analysis, including by machine learning models, to determine other properties. For example, having isolated the areas that correspond to a particular region type, the system can limit an analysis process to be performed using areas for that region type. For example, analysis of the chemical composition of the strawberry (e.g., sugar content in degrees Brix or in other units) can be based on the set of pixels identified as corresponding to the flesh of the strawberry, omitting the pixels corresponding to seeds, leaves, or background that would skew the results if considered. Information about the pixels corresponding to the flesh region type for the strawberry, for image data of each of one or more spectral bands of the hyperspectral image 115, be provided to a machine learning model that makes the estimate about the sugar content or other property of the strawberry. Similarly, the segmented data may be used to assess other properties, such as ripeness, overall quality, expected shelf life, etc.

The spectral bands used for segmentation may be different from those used for subsequent analysis. For example, segmentation to distinguish the flesh and seeds may use image data for bands 1 and 2. The segmentation results may then be applied to image data for band 3, which is indicative of a chemical property such as sugar content, and band 4 which is indicative of water content. In general, the approach allows each region type to be segmented using the image data for the band(s) that most accurately distinguish between the region types of interest. Analysis for any properties of interest (e.g., presence or concentration of different chemicals, surface features, structural characteristics, texture, etc.) can benefit from that segmentation, even regardless of the set of bands that best provide image data for the properties to be evaluated.

Figure 3:
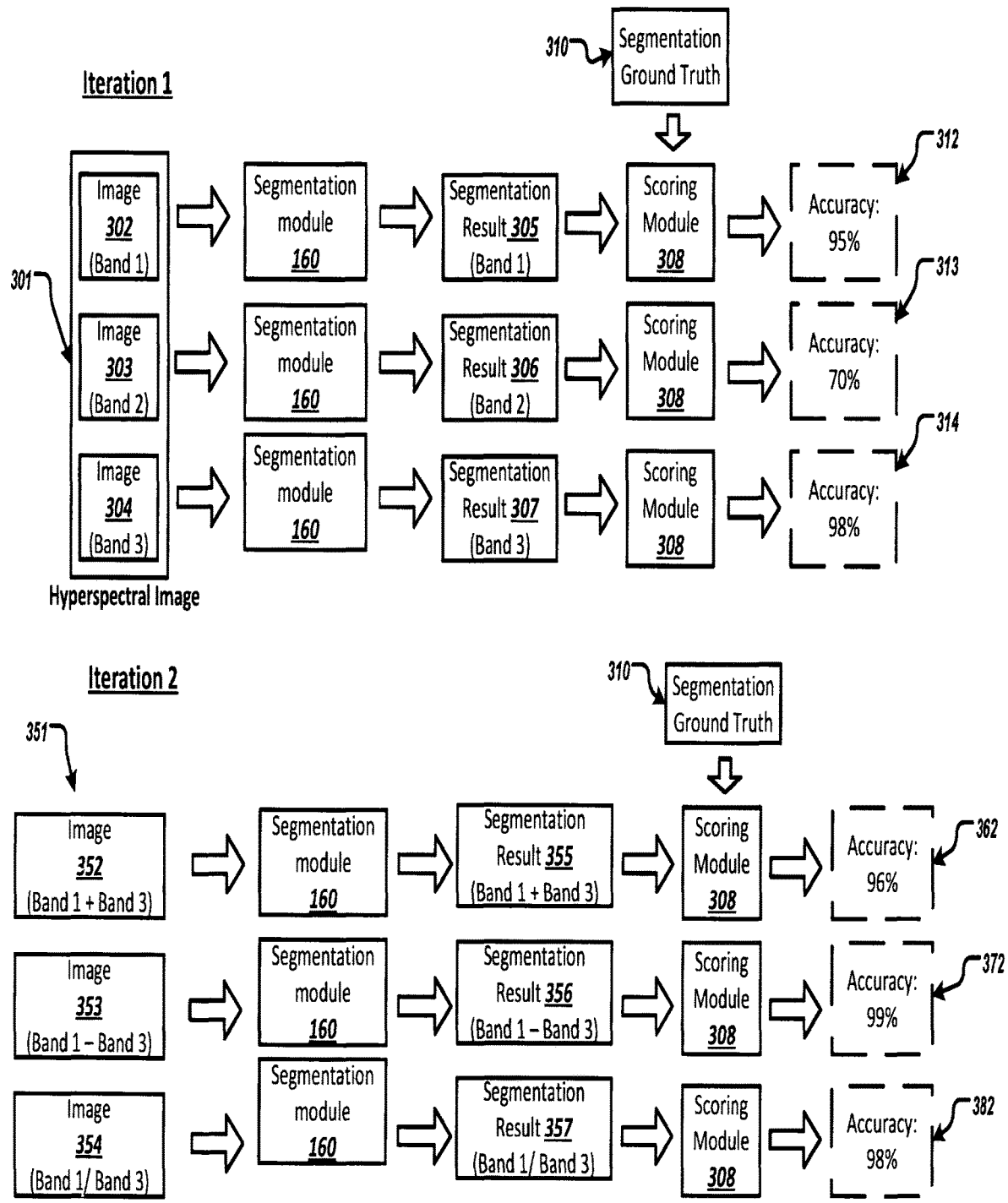
FIG. 3 is a diagram illustrating an example of automatically generating and selecting different bands of image data for performing image segmentation.

FIG. 3 is an example process diagram illustrating an example of iteratively selecting different band configurations to specify for a segmentation profile. As mentioned before, a hyperspectral image comprises multiple 2D images, each representing the measured reflectance for a different wavelength band. For simplicity, the example of FIG. 3 uses a hyperspectral image 301 with image data for only three bands, band 1, band 2 and band 3, although in many implementations many more bands are used. In addition, the example in FIG. 3 shows analysis for selecting the band configuration to use for a single region type of a single object type. The same process may be performed for each of multiple region types, and for each of various different object types.

In some implementations, in a first iteration of the selection process, the system can assess the image data for each individual band in the source hyperspectral image 301 and determine how well the desired region type can be segmented from that band. For example, each image 302-304 of the hyperspectral image 301 has segmentation applied to generate a segmentation result 305-307. A scoring module compares the segmentation result based on each band's image with the segmentation ground truth for the region and generates a score 312-314 that represents the performance of segmentation for a particular band. For example, the band 1 image 302 of the hyperspectral image 301 is provided as input to the segmentation module 160. The segmentation module 160 performs segmentation and generates the segmentation result 305 based on processing the band 1 image 302. The scoring module 308 compares the segmentation result 305 with the ground truth segmentation 310 and generates a score 312 that indicates an accuracy of 95%. The same process can be done to evaluate each of the other bands in the hyperspectral image 301.

The system then compares the scores 312-314 (e.g., segmentation accuracy scores) for the respective bands to select those that indicate the highest accuracy. For example, a predetermined number of bands can be selected (e.g., the n bands having the highest scores) or a threshold can be applied (e.g., select bands having an accuracy above 80%). The selected bands are then used in a second iteration of the selection process, to evaluate potential combinations of the bands.

For the second selection iteration, the system generates new combinations of bands to test. This can include combining different pairs of the bands selected in the first iteration, using different functions (e.g., sum, difference, product, quotient, maximum, minimum, etc. across a pair of images for different bands). This results in synthetic or composite images, combining selected bands with specific functions as candidates to us in segmentation. For example, during iteration 1, band 1 and band 3 of the hyperspectral image 301 were selected based on these bands having the highest accuracy scores 312 and 332. In the second iteration, the image data for these two bands are combined in different ways to generate new composite or aggregate images. The selected band 1 and band 3 are combined to form the three new images: (1) band 1+band 3, (2) band 1−band 3, and (3) band 1/band 3. The images resulting from these three new band combinations comprise the image collection 351.

The second iteration performs the same steps on the images in the image collection 351 as in iteration 1, e.g., performing segmentation with each image, comparing the segmentation result to the ground truth segmentation 310, generating scores for the accuracy of the segmentations, and comparing the scores, ultimately selecting the subset of images 352-354 from the image collection 351 that provide the best accuracy. For example, during iteration 2, the images in the image collection 351 each undergo the same segmentation and selection process as described for iteration 1. For example, image 352 (formed by adding the image data of band 1 and the image data of band 3) is provided as input to the segmentation module 160. The segmentation module 160 performs segmentation and generates the segmentation result 355 for this band combination (band 1+band 3). The scoring module 308 compares the segmentation result 355 with the ground truth 310 and generates a score 322 that indicates an accuracy of 96%. Segmentation results and scores are determined for each of the other images that were generated with different operators used to combine the data from bands 1 and 3. The system then selects the band configuration(s) that provide the best accuracy of segmentation.

The process can continue for additional iterations, as needed, for example, as long as the maximum accuracy achieved in each iteration increases by at least a threshold amount, until a maximum number of iterations is reached, until a minimum level of accuracy is reached, until candidate band combinations reach a maximum number of operations or bands, or until another condition is reached. The highest-accuracy bands across the various iterations are selected and added to the profile for the region type and object type being evaluated. This can include specifying a subset of the original bands of the hyperspectral image 301 and/or for certain synthetic bands, e.g., subsets of bands combined with a certain operator or function.

Figure 4:
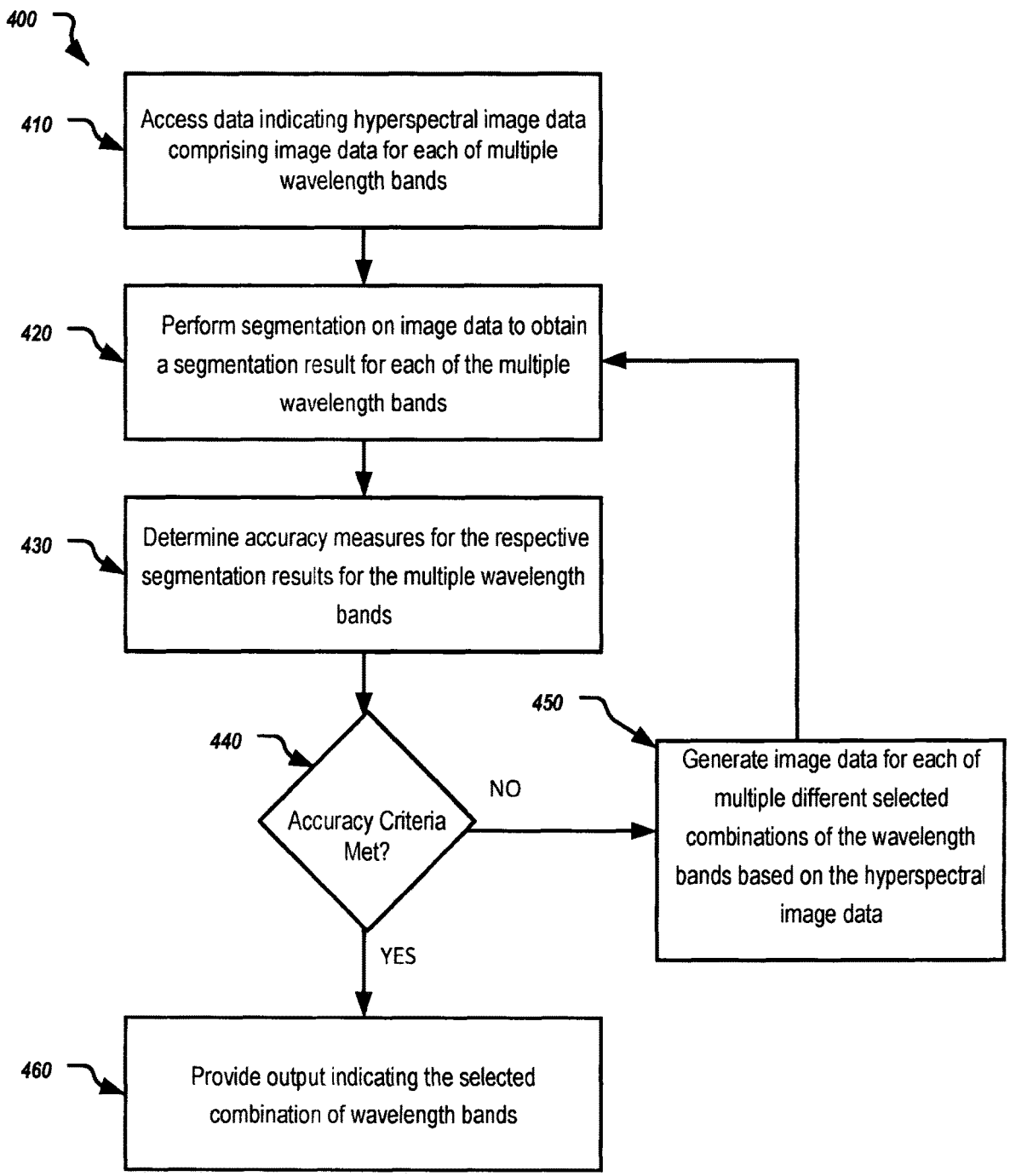
FIG. 4 is a flow diagram describing a process for automatically generating and selecting wavelength bands to use in segmenting images of an object.

FIG. 4 is a flow diagram illustrating an example of a process 400 for band selection and hyperspectral image segmentation. Process 400 is an iterative process where for each of the regions of interest, the process iterates multiple times until a termination criteria is met. During each iteration, the process 400 performs segmentation of the hyperspectral image, selects based on the performance of the segmentation a set of bands, combines the bands within the set of bands to generate new bands, and generates a new hyperspectral image with the new bands. Briefly the process 400 includes accessing hyperspectral image data comprising multiple wavelength bands. Generating image data for each of multiple different combinations of the wavelength bands based on the hyperspectral image data. Performing segmentation for each of the generated sets of image data to obtain a segmentation result for each of the multiple different combinations of wavelength bands. Determining accuracy measures for the respective segmentation results for the multiple different combinations of wavelength bands. Selecting one of the combinations of wavelength bands based on the accuracy measures. Providing output indicating the selected combination of wavelength bands.

In greater detail, hyperspectral image data comprising multiple images with different wavelength bands is obtained (410). As mentioned before, hyperspectral images have three dimensions, x, y and z where x, y represent the spatial dimension and z represents the number of spectral/wavelength bands. In one interpretation, a hyperspectral image comprises multiple two-dimensional images where each two-dimensional image is represented by x, y spatial dimension and each of the two-dimensional images has a different spectral/wavelength band which is represented by z. Most hyperspectral images have hundreds or maybe thousands of bands depending on the imaging technique. For example, the camera system 110 takes a hyperspectral image 115 that includes N images, where each of the images represents data from a different wavelength band.

For each of the multiple region types, the process 400 performs segmentation of the hyperspectral image and generates segmentation result (420). As mentioned before, a hyperspectral image comprises multiple images with different wavelength bands. Each image with a particular wavelength band of the hyperspectral image undergoes segmentation. For example, during iteration 1, image 301 includes three images 302, 303, 304 for different wavelength bands, and these are provided as input to the segmentation module 160. Segmentation of each image with a specific wavelength generates a segmentation result. For example, segmentation of image 302 generates segmentation result 305. Similarly segmentation of image 303 and 304 generates segmentation results 306 and 307 respectively.

The segmentation result is compared to the ground truth segmentation to generate a performance score (430). For example, the scoring module 308 compares segmentation result 305 of the image 302 to the ground truth segmentation to generate the accuracy of segmentation of image 302 with band 1. Similarly the scoring module 308 compares segmentation result 306 and 307 with the segmentation ground truth 310 to generate accuracy 322 and 332.

The accuracy of segmentation of the hyperspectral image in any of the bands is compared to the desired criteria (440). For example, if the user wants a segmentation accuracy of 99%, but the maximum accuracy of segmentation in the bands for the particular iteration is not equal to or more than 99%, the process 400 performs a selection process from among the bands with maximum accuracy. However, if the maximum accuracy of segmentation in any of the bands meets the desired criteria, the process 400 provides the band as an output.

If the segmentation accuracy of the wavelength bands does not meet the desired criteria, the process 400 selects multiple different bands from among the bands with a certain performance score and generates new wavelength bands using the multiple different bands (450). For example, segmentation of the three images 302, 303 and 304 with different bands during iteration 1 generates an accuracy score of 95%, 70% and 98% thereby not meeting the desired criteria of 99%. The process 450 selects band 1 and band 3 based on their high accuracy and generates new bands 352, 353 and 354. These three new bands form a new hyperspectral image 351 in iteration 2.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of providing incentives for media sharing and methods have been described, it should be recognized that numerous other applications are contemplated. Accordingly, other implementations are within the scope of the following claims.

What is claimed is:

1. A computer-implemented method performed comprising:
   obtaining image data of a hyperspectral image, the image data comprising image data for each of multiple wavelength bands;
   accessing stored segmentation profile data for a particular object type that indicates a predetermined subset of the wavelength bands designated for segmenting different region types for images of an object of the particular object type;
   segmenting the image data into multiple regions using the predetermined subset of the wavelength bands specified in the stored segmentation profile data to segment the different region types; and
   providing output data that identifies one or more particular regions of the multiple regions, wherein the one or more particular regions correspond to a particular region type of the different region types.

2. The computer-implemented method of claim 1, wherein the predetermined subset of wavelength comprises different combinations of the wavelength bands, wherein each of the different combinations includes two or more of the multiple wavelength bands.

3. The computer-implemented method of claim 1, wherein the predetermined subset of wavelength bands comprises different pairs of the multiple wavelength bands.

4. The computer-implemented method of claim 1, wherein the accessed stored segmentation profile data specifies, for at least one of the different region types, a combination of two wavelength bands that represents a difference between the image data for the two wavelength bands divided by a sum of the image data for the two wavelength bands.

5. The computer-implemented method of claim 1, further comprising:
   accessing data that indicates, for each region type of the different region types, one or more operations to be performed on image data for the predetermined subset of the wavelength bands that corresponds to the region type; and
   generating, for each region type of the different region types, a modified set of image data by performing the one or more operations corresponding to the region type on the predetermined subset of the wavelength bands that is designated for the region type;
   wherein segmenting the image data into multiple regions comprises using the modified set of image data, for each region type of the different region types, to segment regions of the region type.

6. The computer-implemented method of claim 1, wherein the different region types correspond to different materials.

7. The computer-implemented method of claim 1, wherein the different region types correspond to different conditions or an object.

8. The computer-implemented method of claim 1, wherein providing the output data comprises providing the output data to a classification system configured to determine a classification for an object represented in the hyperspectral image.

9. The computer-implemented method of claim 1, comprising using one or more of the segmented regions to determine a classification of or a condition of an object represented in the hyperspectral image.

10. A computer-program product tangibly embodied in a non-transitory machine-readable storage medium, including instructions configured to cause one or more data processors to perform a set of actions including:
   obtaining image data of a hyperspectral image, the image data comprising image data for each of multiple wavelength bands;
   accessing stored segmentation profile data for a particular object type that indicates a predetermined subset of the wavelength bands designated for segmenting different region types for images of an object of the particular object type;

segmenting the image data into multiple regions using the predetermined subset of the wavelength bands specified in the stored segmentation profile data to segment the different region types; and providing output data that identifies one or more particular regions of the multiple regions, wherein the one or more particular regions correspond to a particular region type of the different region types.

11. The computer-program product of claim 10, wherein the predetermined subset of wavelength comprises different combinations of the wavelength bands, wherein each of the different combinations includes two or more of the multiple wavelength bands.

12. The computer-program product of claim 10, wherein the predetermined subset of wavelength bands comprises different pairs of the multiple wavelength bands.

13. The computer-program product of claim 10, wherein the accessed stored segmentation profile data specifies, for at least one of the different region types, a combination of two wavelength bands that represents a difference between the image data for the two wavelength bands divided by a sum of the image data for the two wavelength bands.

14. The computer-program product of claim 10, wherein the set of actions further includes:

accessing data that indicates, for each region type of the different region types, one or more operations to be performed on image data for the predetermined subset of the wavelength bands that corresponds to the region type; and generating, for each region type of the different region types, a modified set of image data by performing the one or more operations corresponding to the region type on the predetermined subset of the wavelength bands that is designated for the region type;

wherein segmenting the image data into multiple regions comprises using the modified set of image data, for each region type of the different region types, to segment regions of the region type.

15. The computer-program product of claim 10, wherein the different region types correspond to different materials.

16. The computer-program product of claim 10, wherein the different region types correspond to different conditions or an object.

17. The computer-program product of claim 10, wherein providing the output data comprises providing the output data to a classification system configured to determine a classification for an object represented in the hyperspectral image.

18. The computer-program product of claim 10, comprising using one or more of the segmented regions to determine a classification of or a condition of an object represented in the hyperspectral image.

19. A system comprising:

one or more data processors; and a non-transitory computer readable storage medium containing instructions which, when executed on the one or more data processors, cause the one or more data processors to perform a sect of actions including:

obtaining image data of a hyperspectral image, the image data comprising image data for each of multiple wavelength bands;

accessing stored segmentation profile data for a particular object type that indicates a predetermined subset of the wavelength bands designated for segmenting different region types for images of an object of the particular object type;

segmenting the image data into multiple regions using the predetermined subset of the wavelength bands specified in the stored segmentation profile data to segment the different region types; and providing output data that identifies one or more particular regions of the multiple regions, wherein the one or more particular regions correspond to a particular region type of the different region types.

20. The system of claim 19, wherein the predetermined subset of wavelength comprises different combinations of the wavelength bands, wherein each of the different combinations includes two or more of the multiple wavelength bands.

* * * * *